(12) United States Patent
Maloney

(10) Patent No.: US 7,109,864 B2
(45) Date of Patent: Sep. 19, 2006

(54) OBJECT CARRIERS AND LIGHTED TAGS FOR AN OBJECT CONTROL AND TRACKING SYSTEM

(75) Inventor: William C. Maloney, Atlanta, GA (US)

(73) Assignee: Key Control Holding, Inc., Houston, TX (US)

( * ) Notice: Subject to any disclaimer, the term of this patent is extended or adjusted under 35 U.S.C. 154(b) by 0 days.

(21) Appl. No.: 11/040,349

(22) Filed: Jan. 21, 2005

(65) Prior Publication Data

US 2005/0179547 A1 Aug. 18, 2005

Related U.S. Application Data

(63) Continuation of application No. 10/355,773, filed on Jan. 31, 2003, now Pat. No. 6,891,473, which is a continuation-in-part of application No. 10/005,235, filed on Dec. 5, 2001, now Pat. No. 6,693,538, which is a continuation of application No. 09/792,987, filed on Feb. 26, 2001, now Pat. No. 6,501,379, which is a continuation of application No. 09/393,225, filed on Sep. 9, 1999, now Pat. No. 6,195,005.

(60) Provisional application No. 60/099,954, filed on Sep. 11, 1998.

(51) Int. Cl.
*G08B 13/14* (2006.01)

(52) U.S. Cl. .............................. 340/568.1; 340/568.7; 340/572.8

(58) Field of Classification Search ............ 340/568.1, 340/568.7, 572.1, 572.4, 572.7, 572.8, 572.9, 340/551, 825.34, 825.49, 572.2; 705/28, 705/32; 235/385
See application file for complete search history.

(56) References Cited

U.S. PATENT DOCUMENTS 29,236 A   7/1860   Walter .......................... 76/15
527,589 A  10/1894  Bristol ........................ 312/212

(Continued)

FOREIGN PATENT DOCUMENTS

GB    1364535      8/1974
WO    WO9504324    2/1993

(Continued)

OTHER PUBLICATIONS

Booklet "50 Ways to Touch Memory—Third Edition"; Dallas Semiconductor—Dallas, TX; 1994; pp. 1-92.

(Continued)

*Primary Examiner*—Van T. Trieu
(74) *Attorney, Agent, or Firm*—Jackson Walker L.L.P.; Mark A. Tidwell, Esq.

(57) ABSTRACT

Object carriers are provided for use with an object tracking and control system of the type having a storage receptacle with a tray provided with an array of slots for receiving ID tags bearing touch memory devices. A computer-based controller is provided for detecting the absence or presence and identity of ID tags disposed in the slots. The carrier of this invention includes a container with an openable panel for placing objects in and removing objects from the carrier. A thin plastic tongue projects from the carrier and bears a touch memory device. Carriers bearing objects to be tracked are placed in the storage receptacle with their tongues extending into the slots of the receptacle. The controller can thus detect and log the removal and replacement of the carrier in the storage receptacle. In one embodiment, the opening and closing of the carrier when it is not stored in the receptacle is detected and logged for tracking access to the carrier in more detail. The invention also includes lighted key tags for use with an object tracking system. Lighted key tags stored in an object tracking system are adapted to emit light when their attached keys are requested by a user. A portion of the key tag may be formed of transparent material that forms a light guide through which the light is transmitted.

19 Claims, 9 Drawing Sheets

U.S. PATENT DOCUMENTS

| | | | |
|---|---|---|---|
| 2,859,789 A | 11/1958 | Buckett | 206/37.4 |
| 2,971,806 A | 2/1961 | Andreasen | 312/223.1 |
| 3,451,043 A | 6/1969 | Krause | 235/385 |
| 3,648,241 A | 3/1972 | Naito et al. | 340/5.5 |
| 4,060,795 A | 11/1977 | Harumiya et al. | 340/518 |
| 4,112,717 A | 9/1978 | Bradley | 70/63 |
| 4,209,787 A | 6/1980 | Freeny, Jr. | 342/457 |
| 4,267,942 A | 5/1981 | Wick, Jr. et al. | 221/2 |
| 4,275,385 A | 6/1981 | White | 340/525 |
| 4,419,734 A | 12/1983 | Wolfson et al. | 702/109 |
| 4,519,522 A | 5/1985 | McElwee | 221/13 |
| 4,549,170 A | 10/1985 | Serres et al. | 340/568.1 |
| 4,575,719 A | 3/1986 | Bertagana et al. | 340/825.35 |
| 4,595,922 A | 6/1986 | Cobb et al. | 340/825.49 |
| 4,635,053 A | 1/1987 | Banks et al. | 340/825.31 |
| 4,636,634 A | 1/1987 | Harper et al. | 350/223 R |
| 4,636,950 A | 1/1987 | Caswell et al. | 705/28 |
| 4,658,357 A | 4/1987 | Carroll et al. | 700/32 |
| 4,661,806 A | 4/1987 | Peters et al. | 340/568.1 |
| 4,673,915 A | 6/1987 | Cobb | 340/330 |
| 4,737,910 A | 4/1988 | Kimbrow | 705/28 |
| 4,783,655 A | 11/1988 | Cobb et al. | 340/825.49 |
| 4,796,209 A | 1/1989 | Burk | 700/302 |
| 4,799,587 A | 1/1989 | Desanto | 206/37.6 |
| 4,812,985 A | 3/1989 | Hambrick et al. | 700/715 |
| 4,814,592 A | 3/1989 | Bradt et al. | 235/381 |
| 4,827,395 A | 5/1989 | Anders et al. | 700/938 |
| 4,839,875 A | 6/1989 | Kuriyama et al. | 369/14 |
| 4,845,492 A | 7/1989 | Cobb et al. | 340/825.49 |
| 4,853,692 A | 8/1989 | Wolk et al. | 340/573.1 |
| 4,866,661 A | 9/1989 | dePrins | 235/3.82 |
| 4,882,569 A | 11/1989 | Dey | 340/572.2 |
| 4,885,571 A | 12/1989 | Pauley et al. | 340/573.4 |
| 4,889,977 A | 12/1989 | Haydon | 235/375 |
| 4,896,024 A | 1/1990 | Morello et al. | 235/381 |
| 4,918,432 A | 4/1990 | Pauley et al. | 340/573.4 |
| 4,926,161 A | 5/1990 | Cupp | 340/988 |
| D308,777 S | 6/1990 | Gambello | D6/467 |
| 4,940,966 A | 7/1990 | Pettigrew et al. | 340/551 |
| 4,960,651 A | 10/1990 | Pettigrew et al. | 428/607 |
| 4,967,906 A | 11/1990 | Morello et al. | 206/387.1 |
| 5,021,778 A | 6/1991 | Walton | 340/825.54 |
| 5,038,023 A | 8/1991 | Saliga | 235/385 |
| 5,062,151 A | 10/1991 | Shipley | 359/154 |
| 5,099,227 A | 3/1992 | Geiszler et al. | 340/572.5 |
| 5,172,829 A | 12/1992 | Dellicker, Jr. | 221/13 |
| 5,182,570 A | 1/1993 | Nysen et al. | 343/795 |
| 5,218,344 A | 6/1993 | Ricketts | 340/573.4 |
| 5,287,414 A | 2/1994 | Foster | 382/100 |
| 5,319,544 A | 6/1994 | Schmerer et al. | 705/28 |
| 5,335,170 A | 8/1994 | Petteruti et al. | 705/28 |
| 5,374,815 A | 12/1994 | Waterhouse et al. | 235/383 |
| 5,402,104 A | 3/1995 | LaRosa | 340/539.1 |
| 5,404,384 A | 4/1995 | Colburn et al. | 377/6 |
| 5,405,048 A | 4/1995 | Rogers et al. | 221/211 |
| 5,426,284 A | 6/1995 | Doyle | 235/385 |
| 5,434,775 A | 7/1995 | Sims et al. | 705/8 |
| 5,448,110 A | 9/1995 | Tuttle et al. | 257/723 |
| 5,455,409 A * | 10/1995 | Smith et al. | 235/385 |
| 5,480,062 A | 1/1996 | Rogers et al. | 221/174 |
| 5,510,770 A | 4/1996 | Rhoads | 340/572.3 |
| 5,521,815 A | 5/1996 | Rose, Jr. | 705/28 |
| 5,525,969 A | 6/1996 | LaDue | 340/573.6 |
| 5,528,222 A | 6/1996 | Moskowitz et al. | 340/572.7 |
| 5,533,079 A | 7/1996 | Colburn et al. | 377/6 |
| 5,554,974 A | 9/1996 | Brady et al. | 340/572.6 |
| D375,857 S | 11/1996 | De Blois | D6/511 |
| 5,574,470 A | 11/1996 | de Vall | 343/895 |
| 5,612,683 A | 3/1997 | Trempala et al. | 340/825.31 |
| 5,627,520 A | 5/1997 | Grubbs et al. | 340/572.1 |
| 5,635,693 A | 6/1997 | Benson et al. | 235/384 |
| 5,661,457 A | 8/1997 | Ghaffari et al. | 340/572.7 |
| D383,341 S | 9/1997 | Grosfillex | D6/511 |
| 5,671,362 A | 9/1997 | Cowe et al. | 340/568.1 |
| 5,689,238 A | 11/1997 | Cannon, Jr. et al. | 340/568.1 |
| 5,703,785 A | 12/1997 | Bluemel et al. | 700/244 |
| 5,708,419 A | 1/1998 | Isaacson et al. | 340/572.5 |
| 5,721,531 A | 2/1998 | Garver et al. | 340/568.1 |
| 5,736,929 A | 4/1998 | Schrott et al. | 340/572.1 |
| 5,739,765 A | 4/1998 | Stanfield et al. | 340/825.49 |
| 5,745,366 A | 4/1998 | Higham et al. | 700/242 |
| 5,768,921 A | 6/1998 | Hill | 70/63 |
| 5,771,003 A | 6/1998 | Seymour | 340/572.1 |
| 5,777,884 A | 7/1998 | Belka et al. | 700/225 |
| 5,794,213 A * | 8/1998 | Markman | 705/23 |
| 5,801,628 A | 9/1998 | Maloney | 340/568.2 |
| 5,805,074 A | 9/1998 | Warren et al. | 340/825.31 |
| 5,821,859 A | 10/1998 | Schrott et al. | 340/572.6 |
| 5,836,002 A | 11/1998 | Morstein et al. | 340/568.1 |
| 5,905,653 A | 5/1999 | Higham et al. | 700/244 |
| 5,934,499 A | 8/1999 | Van der Hoven | 220/475 |
| 5,936,527 A | 8/1999 | Isaacman et al. | 340/572.1 |
| 5,957,372 A | 9/1999 | Dean et al. | 232/43.1 |
| D415,367 S | 10/1999 | Smith | D6/407 |
| 5,961,036 A | 10/1999 | Michael et al. | 232/43.1 |
| 5,963,134 A | 10/1999 | Bowers et al. | 340/572.1 |
| 5,971,593 A | 10/1999 | McGrady | 700/233 |
| 6,054,924 A | 4/2000 | Dames et al. | 340/572.6 |
| 6,069,563 A | 5/2000 | Kadner et al. | 340/571 |
| 6,073,834 A | 6/2000 | Michael et al. | 232/43.1 |
| 6,075,441 A | 6/2000 | Maloney | 340/568.1 |
| D429,093 S | 8/2000 | Miller | D6/467 |
| 6,131,808 A | 10/2000 | Oires et al. | 340/5.6 |
| 6,148,271 A | 11/2000 | Marinelli | 702/141 |
| 6,195,005 B1 | 2/2001 | Maloney | 340/568.1 |
| 6,204,764 B1 | 3/2001 | Maloney | 340/568.1 |
| 6,232,876 B1 | 5/2001 | Maloney | 340/568.1 |
| 6,292,795 B1 | 9/2001 | Peters et al. | 707/3 |
| 6,431,438 B1 | 8/2002 | Pires et al. | 235/375 |
| 6,707,381 B1 | 3/2004 | Maloney | 340/568.1 |
| 6,788,997 B1 | 9/2004 | Frederick | 700/236 |

FOREIGN PATENT DOCUMENTS

| | | |
|---|---|---|
| WO | WO9512858 | 5/1995 |
| WO | WO 96/31790 | 10/1996 |
| WO | WO 97/04338 | 2/1997 |
| WO | WO 97/09687 | 3/1997 |
| WO | WO 97/48990 | 12/1997 |
| WO | WO 98/15851 | 4/1998 |
| WO | WO 98/15853 | 4/1998 |
| WO | WO 98/26312 | 6/1998 |
| WO | WO 99/09436 | 2/1999 |
| WO | WO 99/23741 | 5/1999 |
| WO | WO 99/35516 | 7/1999 |

OTHER PUBLICATIONS

Key-Vault—Advanced Key Management Brochure—Integrated Software Solutions, Inc. 2003.

Dallas Semiconductor—DS2407 Dual Addressable Switch Plus 1K-Bit Memory—3 Page Brochure—1995.

Dallas Semiconductor—Application Note 104—Minimalist Temperature Control Demo—pp. 1901-1904—1995.

Dallas Semiconductor—Application Note 106—Complex MicroLANs—pp. 1905-1919—1995.

Affidavit of James R. Adams, Ph.D. In Support of Key Register's Response to Key-Trak's Motion for Partial Summary Judgment dated Sep. 4, 2003—Along with 6 Exhibits.

Affidavit of James R. Adams, Ph.D. In Support of Key Register's Response to Key-Trak's Motion Combined Motion for Partial Summary Judgment dated Sep. 4, 2003—Along with 9 Exhibits.

Defendants' Opposition to Motion for Partial Summary Judgment on Defendants' Unenforceability and Unclean Hands Affirmative Defenses dated Sep. 4, 2003.

Defendants' Opposition to Combined Motion for Partial Summary Judgment on Infringement and Validity and for Certification dated Sep. 4, 2003.

Declaration of Michael R. Slobasky, Esq. Dated Sep. 4, 2003.

Plaintiff's Motion for Partial Summary Judgment on Defendants' Unenforceability and Unclean Hands Affirmative Defenses, Notice of Motion, and Supporting Memorandum of Points and Authorities.

'Proposed∝ Order Granting Plaintiff's Motion for Partial Summary Judgment on Defendants' Unenforceability and Unclean Hands Affirmative Defenses.

Plaintiff's Combined Motion for Partial Summary Judgment of Infringement and Validity and for Certification, Notice of Motion, and Supporting Memorandum of Points and Authorities.

Memory-Based Identifier Tag Provdes Digital ID—Dave Bursky-Electronic Design—Jul. 25, 1992—pp. 153 and 156.

* cited by examiner

SCHEMATIC FOR A STORAGE BOX

OBJECT CARRIERS AND LIGHTED TAGS FOR AN OBJECT CONTROL AND TRACKING SYSTEM

REFERENCE TO RELATED APPLICATION

The present patent application is a continuation of U.S. patent application Ser. No. 10/355,773, filed on Jan. 31, 2003, now U.S. Pat. No. 6,891,473; which application is a continuation-in-part of co-pending U.S. patent application Ser. No. 10/005,235 filed on Dec. 5, 2001, now U.S. Pat. No. 6,693,538, which is a continuation of U.S. patent application Ser. No. 09/792,987 filed Feb. 26, 2001, now U.S. Pat. No. 6,501,379, which is a continuation of U.S. patent application Ser. No. 09/393,225 filed Sep. 9, 1999, now U.S. Pat. No. 6,195,005, which, in turn, claims the benefit of the filing date of U.S. provisional patent application Ser. No. 60/099,954 filed Sep. 11, 1998.

TECHNICAL FIELD

This invention relates generally to object tracking and control systems and more particularly to enhancements usable with such systems for tracking larger or collections of keys and loose objects other than keys.

BACKGROUND OF THE INVENTION

Many objects have intrinsic value or have value because they provide access to other valuable objects. For instance, jewelry and coins have inherent and intrinsic value while keys, such as keys to vehicles, have value because they provide access to other valuable objects, namely automobiles and trucks. Further, access to and control of some items, such as narcotics for example, needs to be monitored, tracked, and controlled to assure against unauthorized access or to assure that proper and appropriate access is catalogued. There is a serious need to be able to track, catalogue access to, and control such objects in a way that is reliable, simple to implement, and virtually tamper proof.

In the past, a variety of systems have been implemented to track and control objects. In the case of keys in an automobile dealership, for example, peg boards have been used to keep track of the keys as salespersons, maintenance personnel, and others remove keys for access to vehicles. Generally, sign-out sheets have been used to log the check-in and check-out of such keys. Obviously, such a manual system of tracking has numerous shortcomings due in large part to the very real potential of human error and forgetfulness in carrying out the sign-in and sign-out procedures.

More recently, automated computer controlled key tracking systems have been implemented for tracking, for example, vehicle keys at car lots and keys to the apartments of apartment complexes. One such system particularly applicable to the present invention is the key tracking system disclosed and claimed in my U.S. Pat. Nos. 5,801,628; 6,075,441; 6,317,044; 6,204,764; and 6,407,665, the disclosures of which are hereby incorporated fully by reference. In this system, referred to herein as the "Key Track" system, keys to a vehicle are attached with a rivet or the like to a thin plastic key tag having a depending tongue. The tongue carries a small button-shaped electronic touch memory device, which stores a ID code. The tongues of the key tags are configured to be insertable in an array of slots formed in a panel within a storage drawer. A printed circuit back plane is disposed beneath the array of slots and is provided with a plurality of pairs of metal contacts, each pair of contacts being aligned with a corresponding one of the slots. When the tongue of a key tag is inserted in a selected one of the slots, its touch memory device is engaged by the corresponding pair of contacts.

A computer based controller is electronically coupled through a data matrix to the contacts on the back plane and periodically polls each pair of contacts, preferably several times per second, to determine the presence or absence of a touch memory device and thus which slots contain key tags and which do not. When a slot contains a key tag, the touch memory device of the tag is read to determine its ID code, from which the identity of the particular key on the tag can be determined through a table lookup. In this way, the absence or presence and location of the key tags and their associated keys can be noted by the controller each time the array of contacts are polled. If a tag present in a slot on a prior polling is absent on a subsequent polling, then the controller notes that that the tag and its key has been removed from the storage drawer. Conversely, if a key tag is detected in a previously empty slot, the controller notes that the tag and its key have been replaced in the storage drawer. The removal and replacement of keys is therefore continuously monitored.

An access feature requires an authorized user such a salesperson to enter an ID code to unlock and access the storage drawer. When the history of removal and replacement of key tags and their keys is combined with other information, such as the time at which tags are removed and replaced and the identities of the persons who accessed the drawer and times of access, access to the keys in the drawer can be controlled and a detailed tracking log can be created. This system greatly decreases instances of lost keys, reduces the time required to find checked-out keys, and generally provides automatic tracking and control of the keys, and thus, to a large extent, controls and tracks the vehicles to which they provide access.

While the Key Track system described above has proven extremely valuable in the tracking and control of keys, it nevertheless has been limited somewhat in the situations to which it is readily applicable. For example, the tags used with the system are made of thin relatively flat plastic material that generally provides for the attachment of a single or only a few keys to the tag. It has been difficult to attach a large collection of keys such as keys on a key ring and even more difficult to attach larger special function keys such as keys that incorporate electronic transmitters for locking and unlocking a car remotely. In these situations, it has been experienced that keys can fall or hang into the slots of the Key Track drawer and short out one or more of the contacts on the backplane, resulting in system errors or failure. While simply providing larger tags is helpful, it has not proven to be a complete solution. Furthermore, the system has generally been poorly applicable to the tracking of loose items such as, for example, jewelry, narcotics, and the like because such items cannot easily be attached to a tag. The present invention is intended to enhance and expand the basic Key Track system for application to these and other situations.

Another relative shortcoming of present electronic key tracking systems such as the Key Track system, and object tracking systems in general, has been limitations resulting from the fact that the keys are only detectable upon check-in and check-out at a central storage location. This has meant that tracking of keys has generally been limited to keeping a log of when the keys are physically removed and replaced in a central storage receptacle. The disposition of keys in the interim has not been trackable. Nevertheless, it is clearly useful to track the movement and use of keys and other objects in the interim between the times when they are checked out and checked back in at the central storage location. For example, in the case of tracking use of keys to apartments by maintenance personnel, it is desirable to know not only that a group of keys were checked out and checked back in at particular times, but also when the keys were used in the interim to access apartments. such information can be useful, for example, when claims of theft or vandalism are levied against security personnel. It can also be useful in general security dispatching to insure that security guards check in at all required stations while making security rounds and to log the activities of such guards during their rounds. In the tracking of narcotics at a hospital, it is desirable to know when and by whom particular narcotics are checked out and checked back in and also the time at which the narcotics are accessed in the interim between check-out and check-in times. In this way, confirmation that patients receive the proper prescriptions at the proper times can easily be made by referring to the resulting log of check-out, access, and check in times. The basic Key Track system has not been readily applicable to such situations. Further, in prior Key Track systems, when a key is requested by a user, the computer controller identifies the location of the key in the Key Track drawer by displaying the row and column of the key. Thus user must then locate this row and column to check out the key. In some cases, users consider this system of identifying and locating a requested key to be inconvenient and cumbersome and it can be subject to human error.

Thus, even though the Key Track system has proven very useful, there exists a continuing need to enhance the system by, among other things, providing for the tracking of larger and bulkier keys and key collections, by providing for the tracking and control of the use of keys and other articles in the interim between check out and check in, and, in a more general sense, to provide for the tracking and control of larger or loose items such as jewelry and narcotics. A further need exists for a convenient and more robust method of identifying a requested key or other object to a user so that the user can quickly locate the object for check-out. It is to the provision of such enhancements and improvements that the present invention is primarily directed.

SUMMARY OF THE INVENTION

Briefly described, the present invention, in one preferred embodiment thereof, comprises enhancements to the Key Track system disclosed in my above referenced and incorporated U.S. patents in order to adapt the system for use in tracking and controlling large collections of or bulky keys, such as keys on a key ring or remote access transmitter keys, and in tracking and controlling larger or loose objects other than keys. The invention further comprises improved methods, devices, and circuits for identifying a requested key or other object to a user visually by activating a light on a tag or box associated with the requested object.

The heart of the first enhancement is a carrier or box adapted to contain a ring of keys, a larger electronic access key, or objects other than keys, such as, for example, jewelry or narcotics. In one embodiment, the carrier comprises a rectangular box-shaped container with an openable door panel on one side. The door panel may be hinged for access to the container or may be displacably or removably attached in another way such as by sliding attachment slots. In one configuration for use with keys on a key ring, the container has a slot on its bottom side and the key ring is provided with an ID tag having a relatively thin plastic tongue carrying a touch memory device. In use, the container is opened and the key ring is placed in the container with its ID tag extending through the slot in the bottom of the container. The container is then shut to contain the key ring and its keys whereupon the entire container can be selectively placed in and removed from the Key Track drawer with the protruding ID tag extending into one of the key tag slots in the drawer. The key ring is thus tracked and access to it controlled in the same manner as a single key attached to a traditional key tag.

To facilitate the alignment of containers with slots in the Key Track drawer, an overlay formed of stamped metal or a wire grid can be attached within the Key Track drawer overlying the slots. The overlay defines an array of openings, each sized to receive a container. The openings are positioned such that when a container is slid into one of the openings, the protruding ID tag is directed into one of the slots in the drawer allowing the controller to read the presence of the ID tag and its key ring within the drawer.

Another embodiment of the invention is intended for use with bulky keys having built in remote entry transmitters or with remote entry transmitters not combined with keys. It has previously been difficult to attach such items to a key tag in the traditional key track system. A smaller container, preferably made of molded plastic, is sized to contain a remote entry key or transmitter. The container comprises rectangular box having an open side for access. A tongue, similar to the tongues on the key tags of the Key Track system, is fixed to the bottom wall of the container and depends therefrom. A touch memory device is carried by the tongue and the tongue is configured to be inserted into the slots in the Key Track drawer. A sliding panel is adapted to slide onto the container from the bottom side thereof and to cover the open side for closing the container and capturing a key in the container. When a key is closed in the container, the container can be placed in one of the slots in a Key Track drawer with its tongue and touch memory device extending into the slot in the traditional way. The attached controller is thus able to detect and track the insertion and subsequent removal of the container from the drawer. Since the sliding panel is slid onto the box from the bottom to close the container, the panel cannot be removed for access to the key without first removing the container from the Key Track drawer, which will be detected by the controller. Thus, since the keys cannot be removed without detection, a measure of security for relatively expensive remote entry transmitters and keys is provided. In addition, since the key is closed within the container, it is protected and its identity cannot be determined simply by looking into the Key Track drawer. Only the controller is able to identify the location of a particular key within the drawer upon a proper query by an authorized user.

In yet another embodiment of the invention, the carrier and Key Track system are enhanced to expand the system beyond its traditional use for tracking keys to a general object tracking and control system. This embodiment is particularly useful for tracking valuable objects such as jewelry or for tracking the use of controlled substances such as narcotics and medication. A set of containers is provided, each container having a box with an open side and a hinged panel that covers the open side and closes the container. The container is provided with a slot or pocket in which a printed circuit board can be slid. The printed circuit board carries a memory device storing a ID code and may also carry other components such as a microcontroller, ancillary memory, an RF transmitter, an RFID tag, and related components. Conductive pads on the printed circuit board are coupled to the components on the board for electronically accessing the components.

A drawer or other storage receptacle is provided for receiving the containers of this embodiment. The drawer has an overlay panel formed with an array of openings or bays each sized to receive one of the containers. A printed circuit back plane is disposed behind the overlay panel and has a plurality of sets of conductive contacts, each set of contacts positioned to engage the conductive pads of a container's printed circuit board when the container is inserted into the corresponding bay. The contacts are wired in a data matrix, which is connected to a computer-based controller as in the traditional Key Track system. Use of this embodiment is similar to use of the traditional Key Track system. The controller detects and logs the removal and replacement of containers in the drawer by reading the ID codes of the memory devices associated with the containers.

This embodiment also may include a further enhancement wherein the printed circuit boards in the containers are more sophisticated and are configured to log the opening and closing of the container between the times when it is checked out and checked back in at the storage drawer. The container may also be provided with sensors to gather other information in the interim period such as, for example, the times when the container passed location transmitters, identification numbers from patient arm bands or ID buttons, or other information. This information can be downloaded to the controller upon check in and correlated with other information to provide valuable data compilations and reports. Such information is useful, for example, in the dispensing of drugs to patients in a hospital, where it is desired to log when the drugs are checked out, by whom, at what times the container was opened while checked out for access to the drugs stored inside, and the identities of patients provided with drugs. This information can be correlated to medication schedules for patients to insure that patients are being provided with the proper drugs at the proper times.

The printed circuit boards of this embodiment can be even further enhanced with simple RF transmitters and/or RFID tags available from a variety of manufacturers. RFID tags are adapted to transmit a code and/or other information to a receiver coupled to the computer-based controller and can be used as an alternative to touch memory devices. Other RF transmitters can be provided if desired to transmit a code upon the occurrence of prescribed events such as, for example, each time the door of the container is opened and its contents accessed. Such functionality provides for real time tracking of access to the container in the interim between check-out and check-in times.

In another embodiment of the invention, an object container or a key tag is provided with an LED that, when lit, projects a light that is visible to a user when observing all the tags and containers within a Key Trak drawer. Circuitry within the container or tag is adapted to activate the LED when a user requests a key or other trackable object attached to a tag or contained within a container. In one embodiment, the entire upper portion of a key tag is made of a transparent material and the LED directs its light into the bottom of this material. In this way, the edges of the upper portion of the key tag appears to light up when a key attached to the tag is requested by a user. Thus, the user can easily identify the location of and remove a requested key simply by looking into a crowded Key Track drawer and noting the carrier or tag that is lighted. Preferably, a delay function is incorporated into the tag so that the LED remains on for a few seconds after the tag is removed from its slot.

Thus, an improved and enhanced method and system for tracking and controlling keys and other objects is now provided. The traditional Key Track system is enhanced to accommodate large numbers of keys on a key ring, bulky or unusually shaped keys and remote entry transmitters, and valuable or controlled loose objects other than keys. In one embodiment, object containers are provided with active electronics, which tracks and logs access to the container between the times when it is check out and checked back in. In another embodiment, an RF transmitter or RFID tag is provided for radio frequency communication to the controller. Further enhancements include lighting a tag or container associated with a requested object to identify it visually to a requesting user. These and other features, objects, and advantages of the invention will become more apparent upon review of the detailed description set forth below taken in conjunction with the accompanying drawing figures, which are briefly described as follows.

DETAILED DESCRIPTION OF THE PREFERRED EMBODIMENTS

Figure 1:
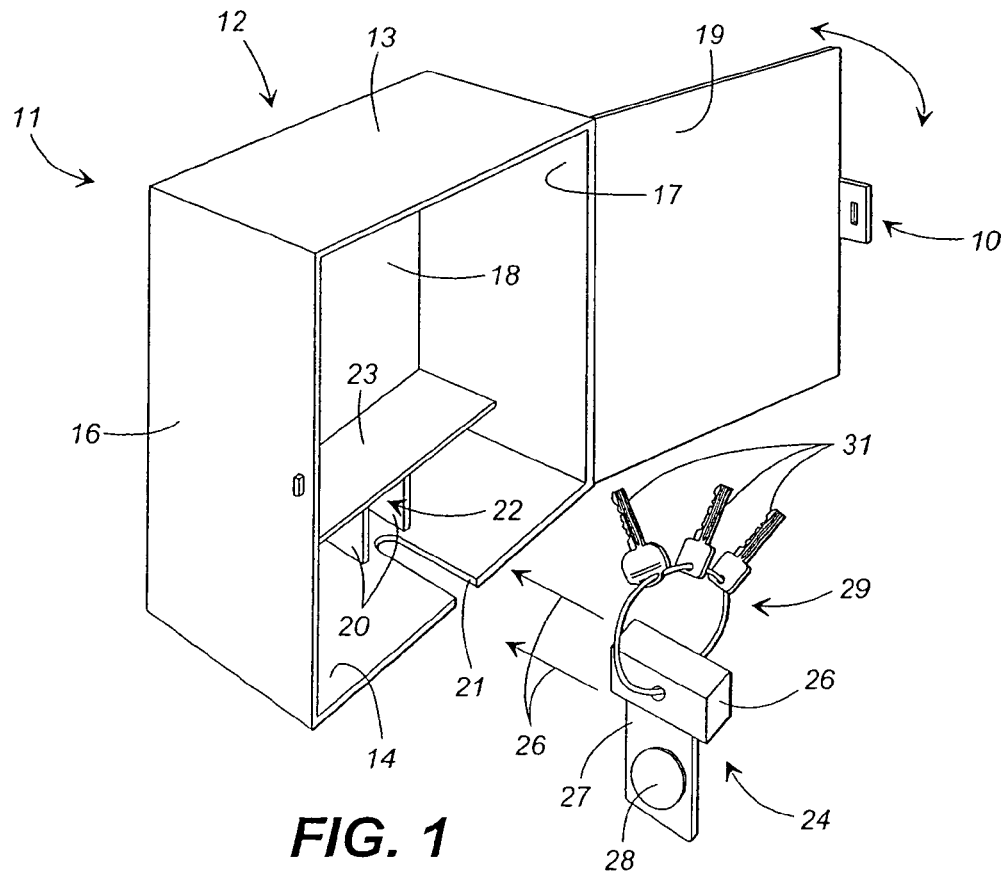
FIG. 1 is a perspective view of a closable carrier usable with the Key Track system to store and track large numbers of keys on a key ring.

Referring now in more detail to the drawings, in which like numerals refer to like parts throughout the several views, FIG. 1 illustrates a carrier for ringed keys that embodies principles of the invention in one preferred form. The carrier 11 comprises a generally rectangular box-shaped body 12 formed by a top panel 13, a bottom panel 14, a left side panel 16, a right side panel 17, and a back panel 18. A front panel 19 preferably is hinged along one side to the edge of the right side panel 17 (or, alternatively to the left or any other side panel) to provide a selectively closable hinged door on the carrier. Locking tabs 30 and 35 preferably are provided on the door and box. The locking tabs have holes that align with one another when the hinged door is closed. A lock or tamper evident ring can be inserted through the aligned holes. In this way, the carrier can be locked shut if desired so that only authorized personnel may access its contents. Alternatively, a tamper evident ring that, when cut, indicates that the carrier has been accessed may be provided. Finally, the carrier preferably is provided with an appropriate latch 10, which may be any suitable form of latch, for releasably latching the door shut when closed to hold the key ring securely in place.

The bottom panel 14 is provided with a slot 21 that extends from the front edge of the bottom panel to a position inwardly spaced from the front edge. A lateral partition 23 spans the left and right side panels and a pair of guide walls 20 extend between the partition 23 and the bottom panel 14 straddling the location of the slot 21 to define a guide slot 22 between the guide walls 20.

An ID tag 24 is adapted to be received in the guide slot 22 and comprises a head 26 from which a relatively thin tongue 27 depends. The head 26 is sized and shaped to slide, as indicated by arrows 25, into and fit partially within the guide 22 with its tongue 27 projecting downwardly through the slot 21. The tongue 27 may be formed of plastic if desired but also may be formed of a more durable and tamper resistant material such as stainless steel or aluminum. A tongue of stainless steel or aluminum renders the ID tag much less susceptible to tampering or defeat by cutting the ID tag and absconding with the keys, although it requires electrically isolated mounting of the touch memory device as described in more detail below. The location of the ID tag in the slot as described also serves to locate the key ring and the keys attached thereto in the upper portion of the carrier. In this way, the keys are isolated from the tag, are held in place in an organized fashion, and do not interfere with operation of the touch memory device.

The head 26 of the ID tag is adapted to be mounted on a key ring with a group of keys 31 (only a few of which are shown in FIG. 1 for clarity) and includes a hole for this purpose. A touch memory device, such as DS1990A touch memory device available from Dallas Semiconductor, is attached to and carried by the tongue 27 in a manner similar to that in which touch memory devices are carried by the key tags in the standard Key Track system. If the tongue 27 is made of plastic or other electrically insulating material, the touch memory device, which has a radially projecting rim at one end, is simply pressed through an appropriately sized hole in the tongue and secured with a mounting ring. In the event the tongue is made of steel, aluminum, or another conducting material, it may be necessary first to install an insulating spacer and then the touch memory device to insulate the touch memory device from the conductive mounting material of the tongue (see FIG. 8). In either case, the touch memory device is carried by the tongue as shown.

In use, the key ring 29 and keys 31 are placed in the carrier 11 as indicated by arrows 25 with the head 26 of the ID tag 24 being inserted into the guide 22 such that its tongue 27 projects downwardly from the container 12 through the slot 21. When so inserted, the keys and key ring reside in the upper portion of the carrier above the location of the partition 23 and the tongue 27 with its touch memory device projects downwardly from the bottom panel 14 through the slot 21. The front panel 19 can then be hinged shut to enclose and contain the keys and keep them from flopping about. The front panel can be releasably latched shut with latch 10 if desired and a lock or tamper evident ring can be installed in the locking tabs 30 and 35 for enhanced security.

Figure 2:
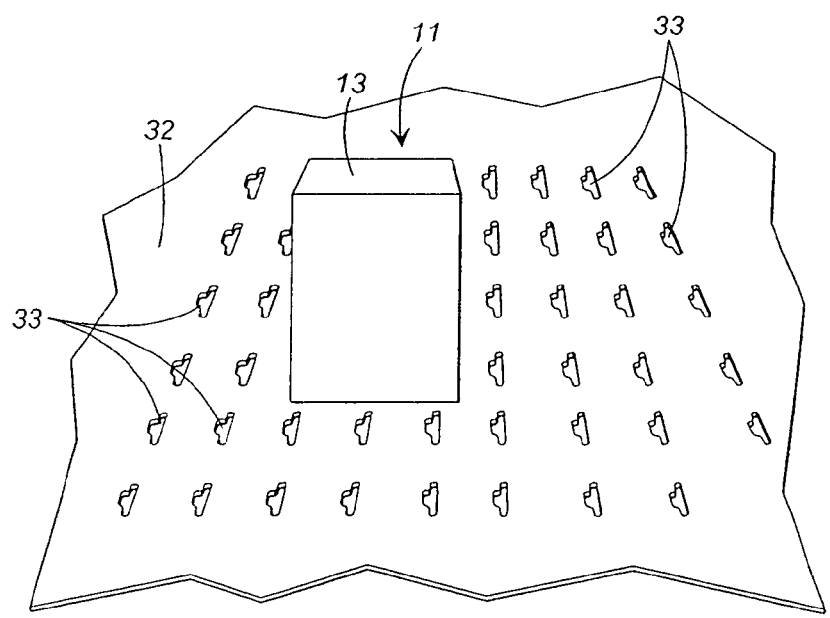
FIG. 2 illustrates the carrier of FIG. 1 inserted in one of the slots of a tray of the Key Track system.

When the front panel 19 is closed, the carrier 11 with keys inside forms a rectangular box as illustrated in FIG. 2 with the tongue 27 of the ID tag projecting downwardly from the bottom panel 14 of the box. The carrier can then be inserted into a Key Track tray 32 with the tongue of the ID tag extending into one of the slots 33 of the tray to engage the touch memory device with the pair of electrical contacts corresponding to the slot. The ID code stored in the touch memory device can then be read by the attached computer-based controller to determine the presence and location in the tray of the keys associated with the ID tag and to determine when the carrier and its keys are removed. The process, structure, and electronics for reading the touch memory device is described in detail in my U.S. Pat. No. 5,801,628 and also disclosed in the manufacturer's specifications and thus need not be described in detail here.

It will be noted from FIG. 2 that, when the carrier of the illustrated embodiment is inserted in a selected slot of the key track storage tray 32, the carrier covers the two slots of the tray on either side of the slot in which its ID tag extends, rendering these slots unavailable for use by other key tags or carriers. While the carrier is shown to cover two slots in FIG. 2, it will be understood that less or more slots might be covered and rendered inaccessible depending upon the size of the carrier. This does not represent a particular disadvantage, however, since the controller will simply read that the covered slots are unoccupied and key tags inserted in other available slots will still be detected and identified when they are present. Although a Key Track drawer will accommodate fewer carriers than traditional key tags, the advantage of tracking and controlling large numbers of keys on key rings in the same way that single keys on key tags are tracked far outweighs the disadvantage of any reduced capacity of the drawer. As detailed below, custom overlays or custom trays may also be used to accommodate the carriers if desired. Further, additional drawers can be added to the system as need to accommodate larger numbers of key tags and carriers and any mix of object carriers and key tags can be used with the existing drawer configuration of the Key Track system.

Figure 3A:
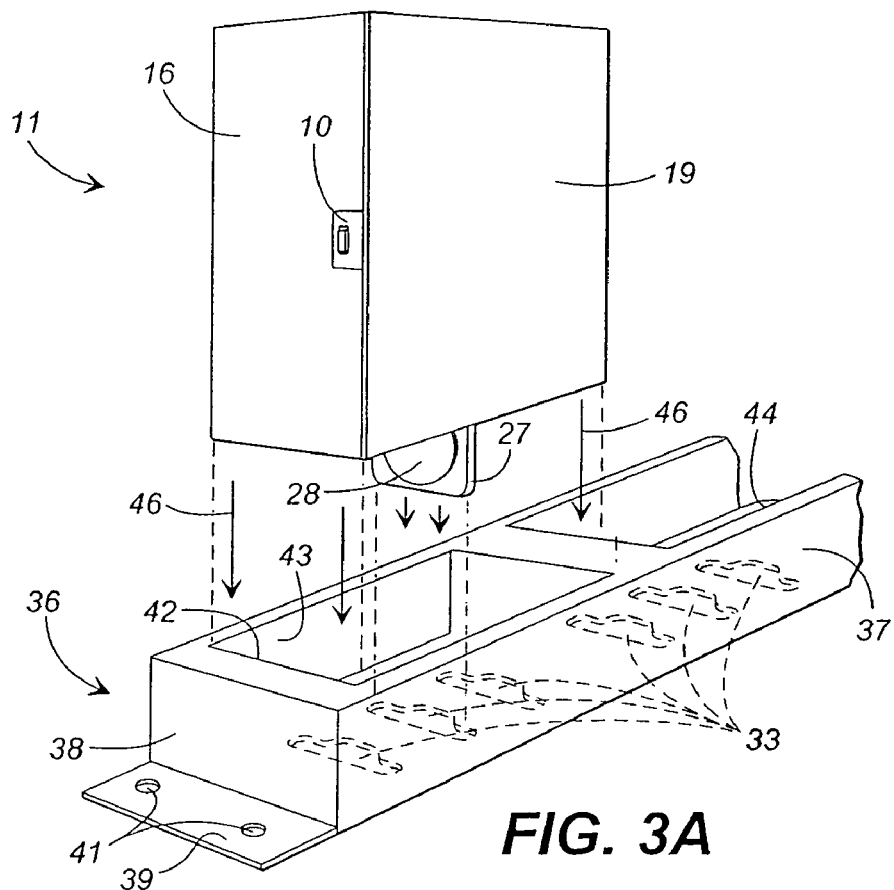
FIG. 3A illustrates a guide or overlay usable with the Key Track system and carrier of FIG. 1 to align and secure the carrier, prevent its opening while mounted in the tray, and to partition the slots of the tray to receive multiple carriers.

FIG. 3A illustrates an enhancement of the carrier system of FIGS. 1 and 2. Here, an overlay or guide 36 is provided for covering a row of slots 33 in the Key Track tray and providing a positioning guide for a plurality of carriers 11. The guide 36, which can be formed of punched and bent sheet metal, comprises opposed sides 37 and opposed ends 38 (only one end is visible in FIG. 3) that form a generally rectangular box shaped structure. A flange 39 is provided at the bottom of each end 38 and holes 41 are bored in the flange for attaching and securing the guide 36 to the Key Track tray 32. The top 40 of the guide 36 is formed to define at least one socket or receptacle 42 that is sized to receive the carrier 11 therein. Preferably, the receptacle 42 is provided with guide flanges 43 projecting downwardly therefrom to guide the carrier 11 into the receptacle when it is inserted therein as indicated by arrows 46.

Additional receptacles 44 are also provided in the guide 36 extending therealong and defining an array of carrier receptacles. The guide 36 thus functions to provide an array of receptacles for receiving carriers 11 with each socket properly aligning its respective carrier with a selected slot 33 in the Key Track tray. In addition, the receptacles hold the hinged front panels 19 of the carriers shut when they are in position within the receptacles. This is important because it prevents a thief from opening the receptacle without first removing it from the tray, which will be detected by the controller. If an unauthorized removal is detected by the controller, appropriate alarms can be generated and actions taken to alert security personnel. Thus, an extra measure of security is provided by the overlay.

Figure 3B:
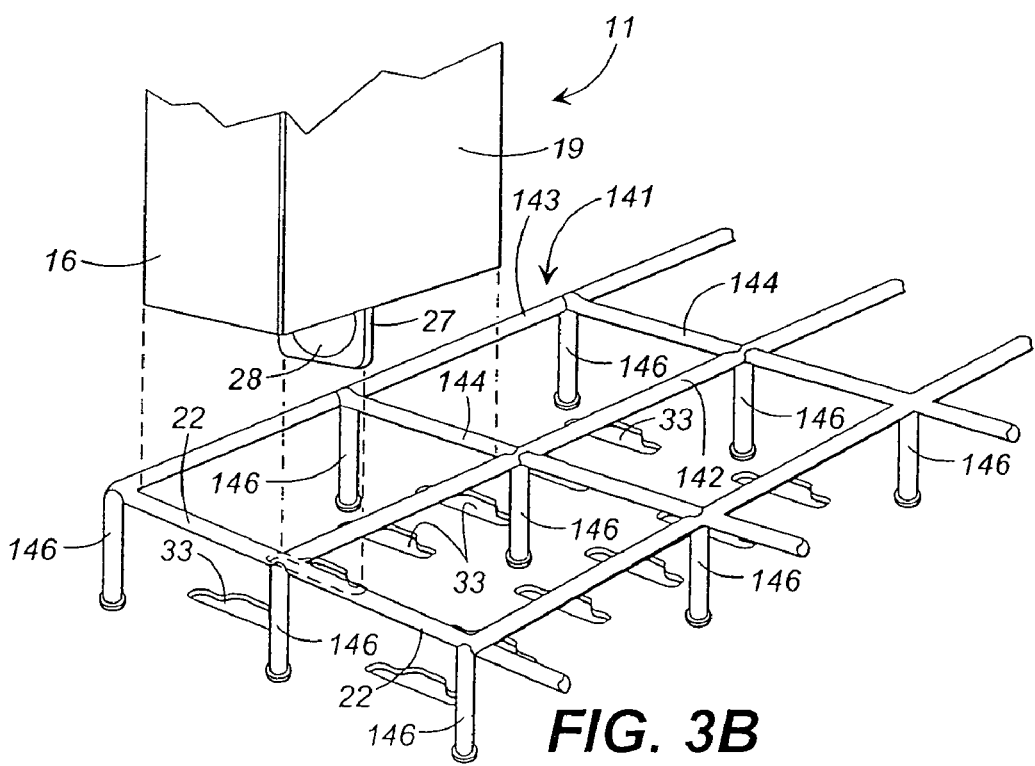
FIG. 3B illustrates another embodiment of the container guide in the form of a wire grid defining slots for receiving and aligning carriers.

FIG. 3B illustrates an alternate embodiment of a carrier guide or overlay for attachment to a Key Track tray to partition the tray into receptacles for receiving carriers. In this embodiment, the tray 32 of a key track drawer is shown with an array of slots 33 for receiving tongues of key tags bearing touch memory devices. A carrier 11, as previously described, is formed of a box 16 and a closable hinged door 19. A tongue 27 depends from the carrier and bears a touch memory device 28. a wire frame guide 141 is formed with spaced apart elongated rails 142 bridged by a set of spaced apart connecting segments 144. The rails 142 and connecting segments 144 define an array of rectangular receptacles, each sized to receive a carrier 11, as indicated by the arrows in FIG. 3B.

Vertically depending legs 146 project downwardly from the rails 142 and 143 and are anchored to the key track tray with appropriate fasteners such as shoulders and bolts. The legs 146 secure the wire frame guide to the key track tray and properly position the rectangular receptacles so that when a carrier 11 is inserted into one of the receptacles, the tongue 27 thereof is directed into one of the slots 33. Thus, the wire frame guide performs a function similar to that of the guide of FIG. 3A, but with a less expensive wire frame structure. Further, since the wire frame is more open than a bent metal guide, the slots 33 can be used with traditional key tags when not holding a carrier and much better visibility is provided for visually identifying the objects in the tray. A simple two row guide is shown in FIG. 3B. It should be understood, however, that multiple row guides are possible and within the scope of the invention. Indeed, the entire key track panel could be overlaid with a wire grid allowing insertion of carriers and/or key tags in any combination. Further, the us of guides such as those illustrated in FIGS. 3A and 3B allows the carriers of this invention to be used with vertically oriented panels and backplanes that may be, for example, mounted on a wall. More efficient storage configurations are therefore possible.

Figure 4:
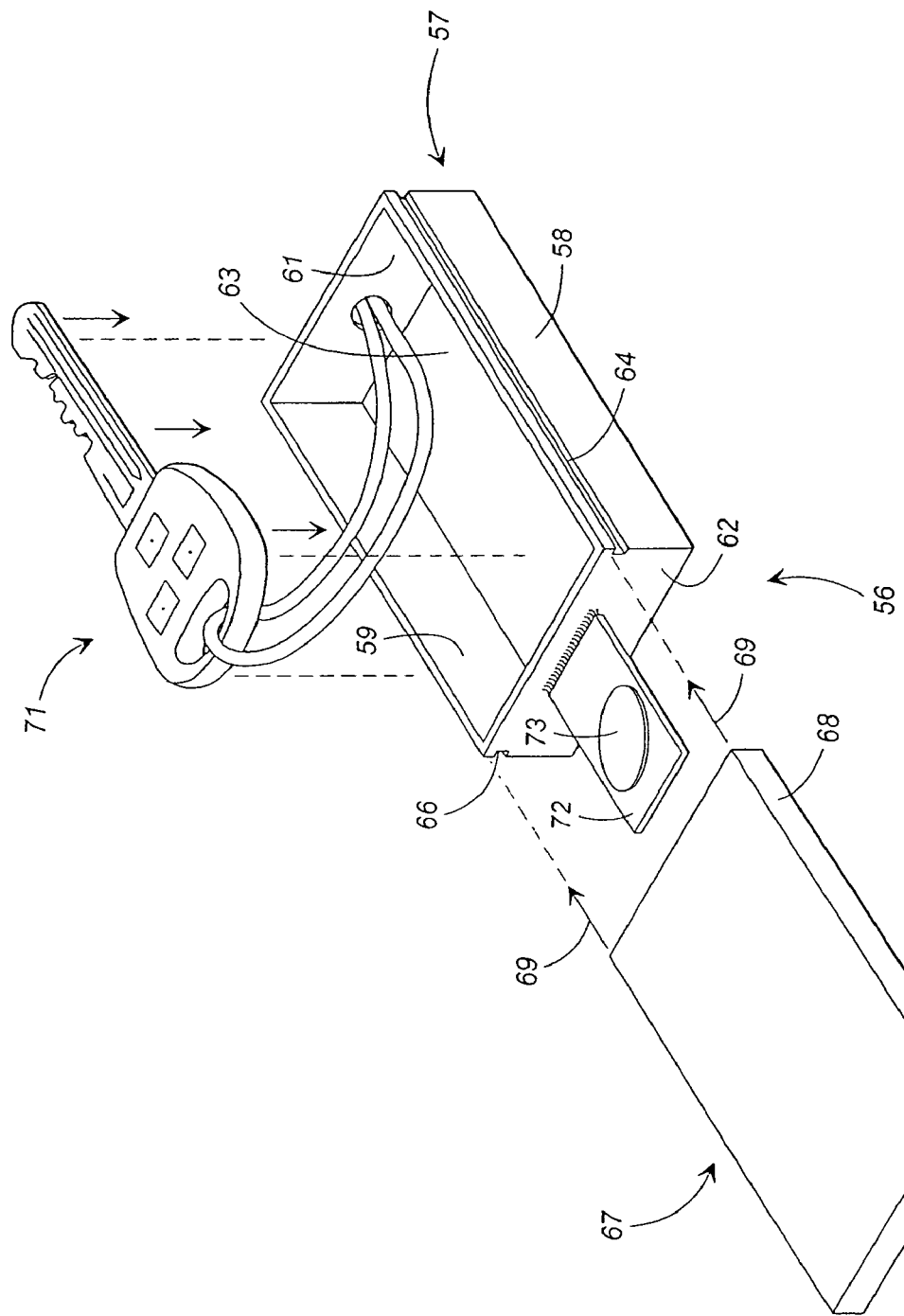
FIG. 4 is a perspective exploded view of an alternate embodiment of the carrier for use with the Key Track system when it is desired to track unusually shaped or sized keys, such as keys incorporating remote entry transmitters.

FIG. 4 illustrates another carrier for use with the Key Track system. This carrier is designed to allow odd shaped, bulky, or expensive keys to be tracked with the key track system in the same way as a loose key attached to an ID tag. These types of keys include keys, such as key 71, with large heads that incorporate transmitters for remotely locking and unlocking the doors of a vehicle to which they correspond. Remote door lock transmitters not incorporated into the vehicle key can also be tracked as well as other small items. The carrier 56 comprises a case 57, which can be made of molded plastic or other appropriate material. The case 57 is formed by a right side panel 58, a left side panel 59, a top panel 61, a bottom panel 62, and a back panel 63, which, in the preferred embodiment, are unitarily molded of plastic. The side panels 58 and 59 are formed with respective grooves or races 64 and 66 that extend along the outside top edges thereof. The grooves 64 and 66 are shaped and sized for slidably receiving a sliding cover 67 having depending sides or skirts 68 on three sides thereof. Inwardly opposed ribs (not visible in FIG. 4) are formed on the inside portions of the side skirts 68 and are sized and positioned to slide into the grooves 64 and 66 when the sliding cover 67 is moved onto the case 57 as indicated by arrows 69. In this way, the case can be closed with a key or other item inside by sliding the cover onto the case.

An ID tab 72 is provided with a touch memory or other ID device 73 and is secured at one end to the bottom panel 62 of the case 57. The ID tab is sized and configured to be inserted into a selected slot of a Key Track tray. In use, a key 71 is placed in the carrier and closed therein by sliding the sliding cover 67 into place. Preferably, the key is secured to the box with a loop of cabling or other appropriate tether (not shown) to prevent the box from becoming separated from its key. The carrier is then stored on the Key Track tray by inserting its ID tab into a selected slot of the tray. The Key Track controller can then track and control access to the key within the carrier in the usual way. Preferably, the carrier 57 is sized to take up no more than one space on the Key Track tray so that other key tags or carriers can be inserted into adjacent slots of the tray.

The carriers of FIGS. 1 through 4 have been described in terms of the storage and tracking of keys. It will be clear to those of ordinary skill in the art, however, that a wide variety of items can be stored in the carriers and thus tracked by the key track controller. For example, use of these carriers might convert a car key tracking system into a system for tracking jewelry, narcotics, or other small valuable or dangerous items. An added advantage when tracking such items is that the items are concealed and hidden within their carriers. Accordingly, only the Key Track controller is able to inform an authorized user of the location within the drawer of each item. An unauthorized user or would be thief cannot simply look into a drawer full of carriers and locate any particular item. Other uses for the carriers of this invention might be conceived by those of skill in the art such that, clearly, the present invention is not intended to be limited just to the storage and tracking of keys.

Figure 5:
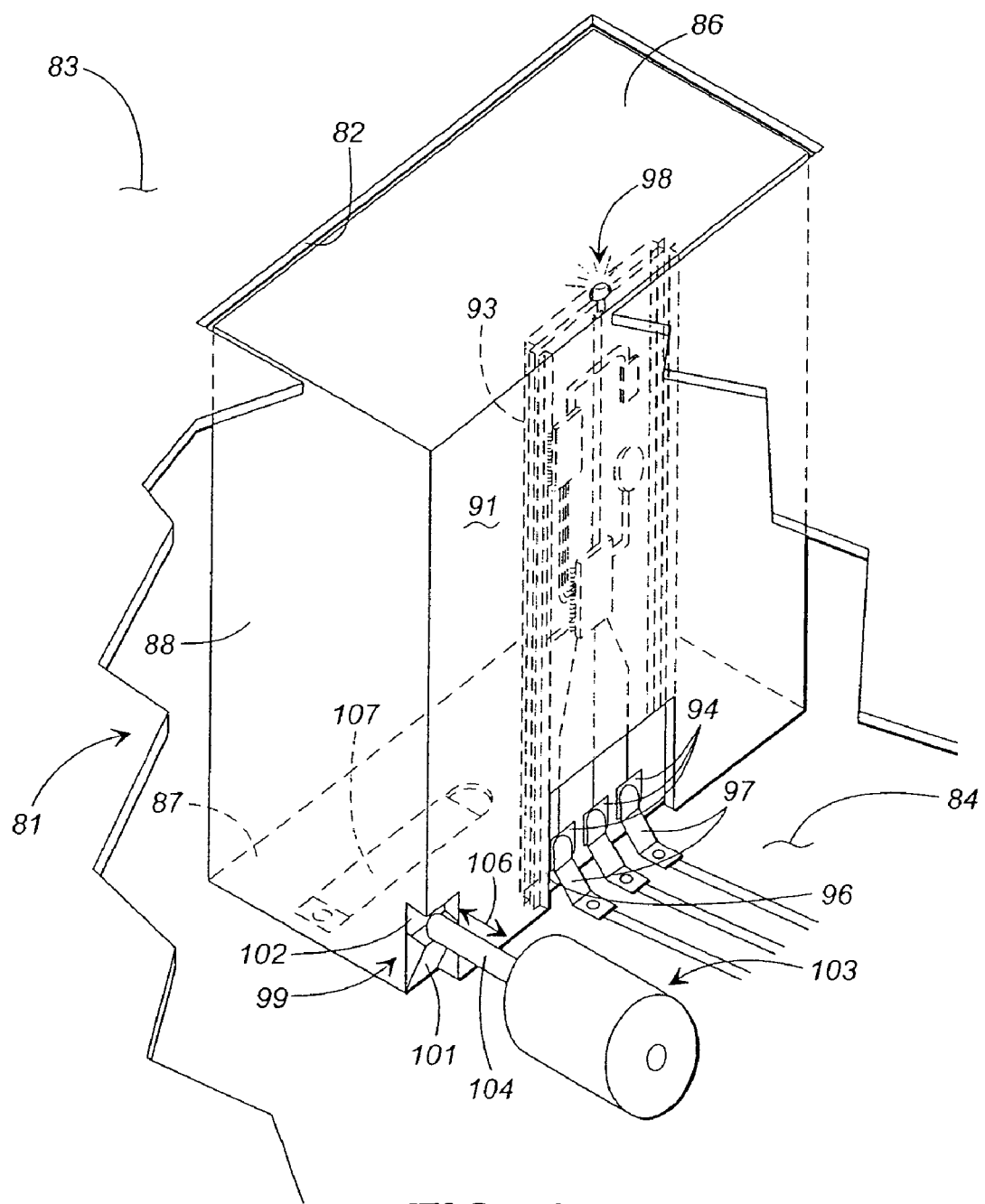
FIG. 5 is a perspective partially cut-away view of an embodiment of the invention in the form of an object tracking system for tracking objects such as jewelry or narcotics.
Figure 6:
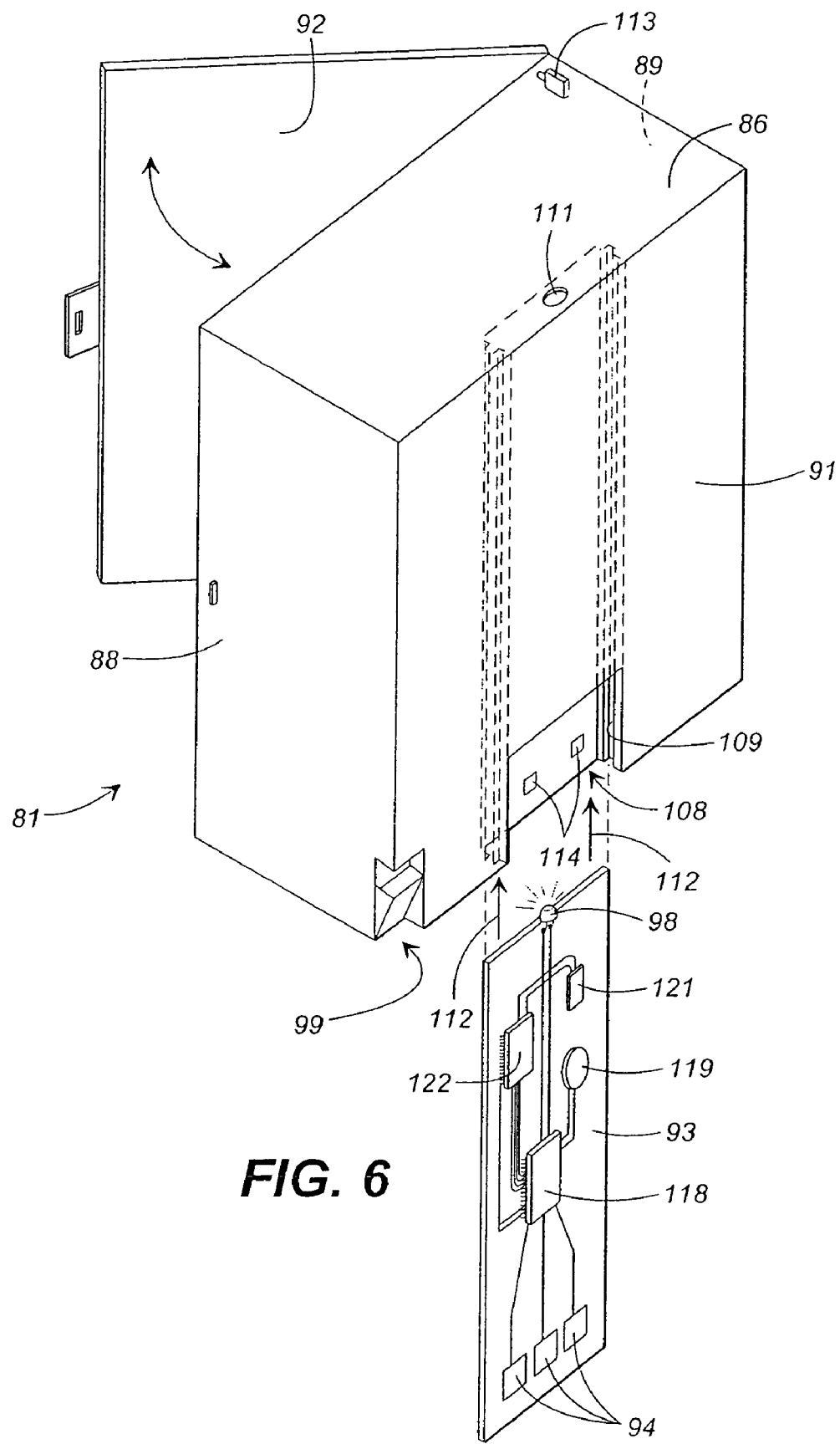
FIG. 6 is a perspective partially exploded view of the carrier of the embodiment of FIG. 5 illustrating the removable printed circuit board thereof.

FIGS. 5 and 6 illustrate an object tracking and control system that embodies principles of the present inventions in yet another form. The object tracking system illustrated in these figures can be used to store, monitor, and track a wide variety of items from automotive keys and apartment keys to narcotics and jewelry, to important files or papers. The system comprises a carrier 81 that, in the illustrated embodiment, is a rectangular box, for containing items to be tracked and controlled. The carrier 81 is sized to be received in a rectangular socket 82 formed in the surface of a receptacle panel 83. The panel 83 may be formed with a large array of receptacles for receiving and continuing a corresponding large number of carriers.

A back plane 84 is mounted behind or beneath the receptacle panel 83 and preferably is spaced therefrom a distance substantially equal to the height of the rectangular carrier 81. In this way, when the carrier is inserted into the receptacle 82 to the back plane, its top panel 86 is substantially flush with the surface of the receptacle panel 83. As described in more detail below, this configuration inhibits a thief from removing the carrier from the receptacle panel by force.

It will be understood that while only one receptacle and one carrier is illustrated in FIG. 5 for clarity of description, a complete system preferably would include a receptacle panel formed with an array of a plurality of receptacles for receiving a plurality of carriers.

In addition to its top panel 86, the carrier 81 is formed with a bottom panel 87, a left side panel 88, a right side panel 89, a back panel 91, and a hinged front panel 92 (FIG. 6). The back panel 91 in the preferred embodiment is formed with a slot or pocket 108 that extends from the bottom panel 87 to the top panel 86. The pocket 108 has an opening 96 formed therein adjacent the bottom panel of the carrier. The pocket is sized to receive and hold a relatively narrow printed circuit board 93 with a portion of the bottom edge of the printed circuit board exposed through the opening 96 for purposes described in more detail below.

The lower left-hand corner of the carrier 81 is formed with a latch 99 defined by a sloped strike 101 and an indentation 102. A solenoid and plunger assembly 103 is mounted to the back plane 84 at a position adjacent the location of the latch 99 by means of an appropriate mounting bracket (omitted from FIG. 5 for clarity). The assembly 103 includes a plunger 104 that is spring biased to its extended position (the spring assembly is not shown in FIG. 5 but spring biased solenoid assemblies are available commercially, are well known to those of skill in the art, and can be retracted by application of a control voltage to the solenoid). The strike 101 formed on the carrier is positioned to engage and retract the spring biased plunger 104 of the solenoid 103 when the carrier is inserted into the receptacle 82. When the carrier is fully inserted, the plunger 104 snaps into the indentation 102 to lock the carrier in place within the receptacle. The carrier can be released with an appropriate control signal from the controller to retract the plunger 104 from the indentation 102. Thus the strike and plunger form an electronically releasable lock that secures the carrier in place in its receptacle until an appropriate signal is provided by the controller. Similar locks can also be provided with the carrier embodiments of FIGS. 1 through 4 if desired.

A leaf spring or other spring 107 preferably is provided for exerting upward biasing force on a carrier locked in the receptacle. In this way, when the carrier is released by applying an appropriate control signal to the solenoid 103 to retract its plunger, the leaf spring causes the carrier to "pop" up out of the receptacle so that it can be grasped for removal.

As illustrated in FIG. 5 and perhaps best seen in FIG. 6, the circuit board 93 within the pocket 108 is etched to expose a set of conductive pads 94 positioned to be exposed through the opening of the pocket 96 when the circuit board is in place therein. A set of corresponding contacts 97 (FIG. 5) are fixed to the back plane 84 and are positioned for electrically contacting the conducting pads 94 when the carrier is inserted completely into the receptacle 82. The contacts 97 are coupled through a data matrix or other appropriate communications buss to a remote computer-based controller as described in my prior U.S. patents for connecting the electronic components of the circuit board to the controller.

Referring now to FIG. 6, the carrier 81 is illustrated with its hinged front panel 92 (which may also be a sliding or other appropriate type of panel) open and with the circuit board 93 displaced from the pocket 108 of the carrier. Arrows 112 indicate insertion of the circuit board 93 into the pocket 108. Once a circuit board is inserted and locked into place within a carrier, it becomes associated with the carrier and thus associated with articles stored in the carrier.

The circuit board 93 carries integrated circuit components for performing the method of the invention. In one embodiment, for example, the circuit board 93 is provided with a touch memory chip such as the touch memory devices provided on ID tags as discussed above. In this case, the chip preferably is surface mounted to the board to save space rather than being housed in a metal case or button. However, the primary function of the memory chip remains the same; that is, to store and transmit its unique internal code when appropriately polled with a polling signal. The memory chip is electrically coupled to the conducting pads 94 at the bottom of the circuit board and the contacts 97 on the back plane are configured and positioned to engage the conductive pads for receiving the ID code of the memory device and transmit it through the data matrix to the controller for detecting the absence or presence and location of the associated carrier within one of the receptacles.

Alternatively, the circuit board might be provided with more sophisticated electronics including a microcontroller or microprocessor 118 and associated components including a crystal 121 and battery 119. A wide variety of configurations are possible and a simple circuit is depicted in FIG. 6 for clarity. The microcontroller, which includes internal memory, may be coupled to an integrated circuit RF transmitter that can be actuated by the microcontroller. A reed switch 113 can be coupled to the front panel of the carrier for communicating a signal to the microcontroller 118 whenever the front panel 92 of the carrier is opened or closed. A light emitting diode (LED) 98 is provided at the top of the circuit board 93 and projects through an opening 111 in the top of the carrier when the board is inserted into the pocket 108. Preferably, the microcontroller is programmed to light the LED whenever the carrier is selected by the system controller of the tracking system. In this way, a user can easily find a selected carrier by identifying the carrier to the controller, whereupon the controller lights the LED of the selected carrier and releases it by actuating the appropriate solenoid.

The embodiment of FIGS. 5 and 6 has many and varied applications. For example, the microcontroller 118 preferably is programmed such that, during the time the carrier is removed from its storage location, a record is kept in the memory of the microcontroller of the times when the hinged front panel of the carrier is open or closed. When the carrier is returned to its storage location, this stored data is downloaded and becomes a record of the use of the carrier and its contents between the times it was checked-out and checked back in.

Alternatively, the microcontroller can be programmed to activate the RF transmitter at intermittent times while the carrier is checked out or to activate the transmitter whenever the door of the carrier is opened or closed. This information, when transmitted back to the main computer based controller, can be tallied in real time as a means of tracking use of the contents of the carrier. These capabilities are useful in a wide variety of situations such as, for example, to track not only when medication was checked out to give to a patient, but the time at which the carrier was opened to administer the medication. Questions about medication delivery can thus be readily answered. A wide variety of other sensors and data gathering capabilities can be provided in such a carrier embodiment including, but not limited to, biometrics information, time and ambient temperature information, information gathered through data ports, and information from various types of on board switches. Further, with on board intelligence, enhanced substantially autonomous functionality is possible. For example, the carrier may be provided with an internal lock that is activated only when an authorized user has checked out or attempts to open the carrier.

Another use of the embodiment of FIGS. 5 and 6 is in tracking keys to an apartment complex. One carrier might, for example, house keys to an entire floor of apartments with each key coupled to the microcontroller so that the microcontroller can detect when a specific key is removed. A detailed record of when the key set was checked out and when each specific key was removed from the carrier is thus easily maintained for use in verifying when personnel had access to particular apartments. The use of RF transmitters associated with objects expands the effectiveness of tracking systems greatly.

Figure 7:
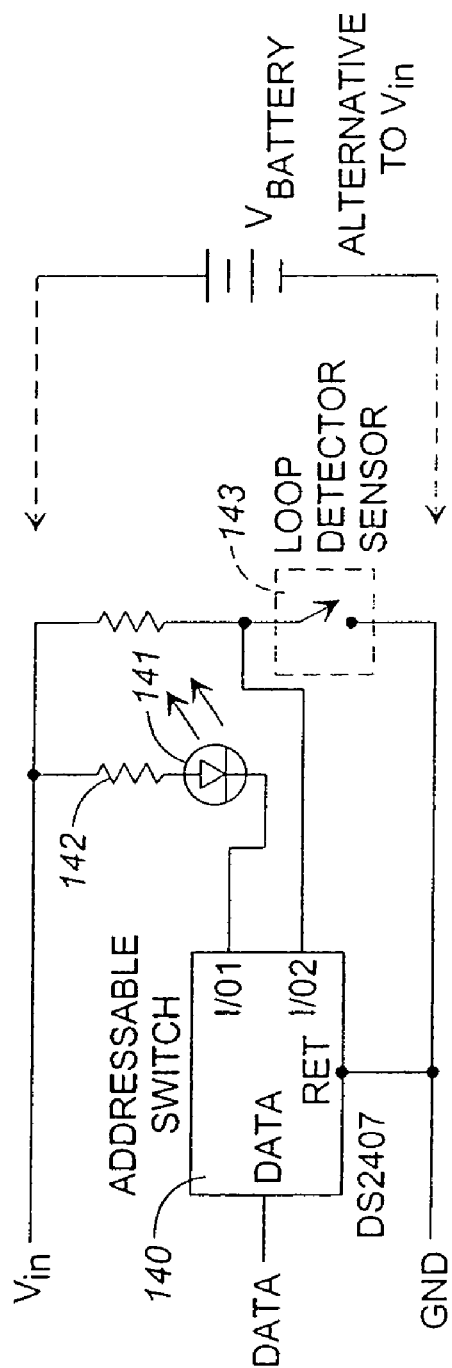
FIG. 7 is a functional electronic schematic diagram showing a preferred circuit for use with the embodiment of FIG. 5.

FIG. 7 is a functional schematic diagram of a circuit usable in the implementation of the embodiment of FIGS. 5 and 6. The circuit comprises an addressable switch in the form of an integrated circuit coupled to the ground, data, and Vin pads of the circuit board. The switch can be a DS2407 or DS2405 addressable switch chip available from Dallas Semiconductors, or any other appropriate integrated circuit chip or discrete components suitable for performing the method of the invention. All such chips and components are specifically incorporated herein by reference and are equivalent to the specific chips disclosed in the preferred embodiments.

I/O 1 of the addressable switch 140 in the embodiment illustrated in FIG. 7 is coupled through an LED 141 and a current limiting resistor 142 to supply voltage Vin, which, is one embodiment, is supplied from the backplane through one of the contacts 94 (FIG. 6). In another embodiment, and as an alternative to supplying Vin from the backplane of an object tracking system, a battery 143 can be provided on the circuit board, in which case only two pads 94 (FIG. 6), one for a data line and one for a ground, are required.

In the circuit of FIG. 7, I/O 2 of the addressable switch 140 is coupled to an on board sensor, which may be a loop detector sensor to detect when an object is removed from the carrier, a reed switch to detect opening of the carrier, of another type of sensor depending on the intended use of the system. Other I/O ports may be provided on some versions of the addressable switch 14o and these may be coupled to other switches or elements, such as locks, latches, etc., for detecting or activating such elements as desired. In use, data can be provided to or read from the addressable switch 141 through the backplane of an object control system. In this way, the central controller of the system is able to download information from the switch regarding events recorded in the interim between check out and check in of the carrier, upload instructions to the carrier to, for example, turn on its LED, unlock its cover, or otherwise, by appropriately activating one or more of the I/O ports.

Figure 8:
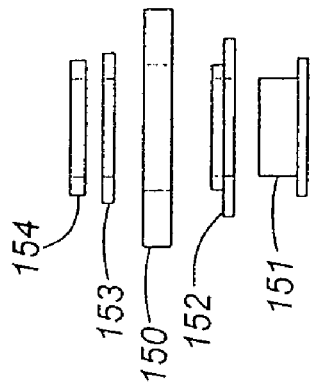
FIG. 8 is an exploded view illustrating the mounting of a touch memory device in a conducting rather than a non conducting tag.

FIG. 8 illustrates a preferred method of attaching or mounting a touch memory device to a steel, aluminum, or other conducting plate material, which may be used instead of a plastic tongue for added security. An opening is formed in the conductive mounting material 150 and the opening is sized for receiving an insulation spacer 152 through which a touch memory ID button is received. An insulating washer 153 is secured around the touch memory button on the other side of the mounting material and a crimp ring is secured around the touch memory button to secure it firmly in place within the opening. In this way, touch memory buttons can be mounted in metal tags for added security while remaining electrically isolated from the tags, which is required for proper operation.

FIGS. 9–12 depict further embodiments of the identification of requested trackable objects with light as shown in FIGS. 5–7 and discussed above relative to those figures. Whereas in the embodiment of FIGS. 5–7, this concept was applied to a trackable object in the form of a container, in the embodiments of FIGS. 9–12 it is applied to a key tag of the type usable with a Key Track system such as those disclosed in my prior patents, which are incorporated herein by reference.

Figure 9:
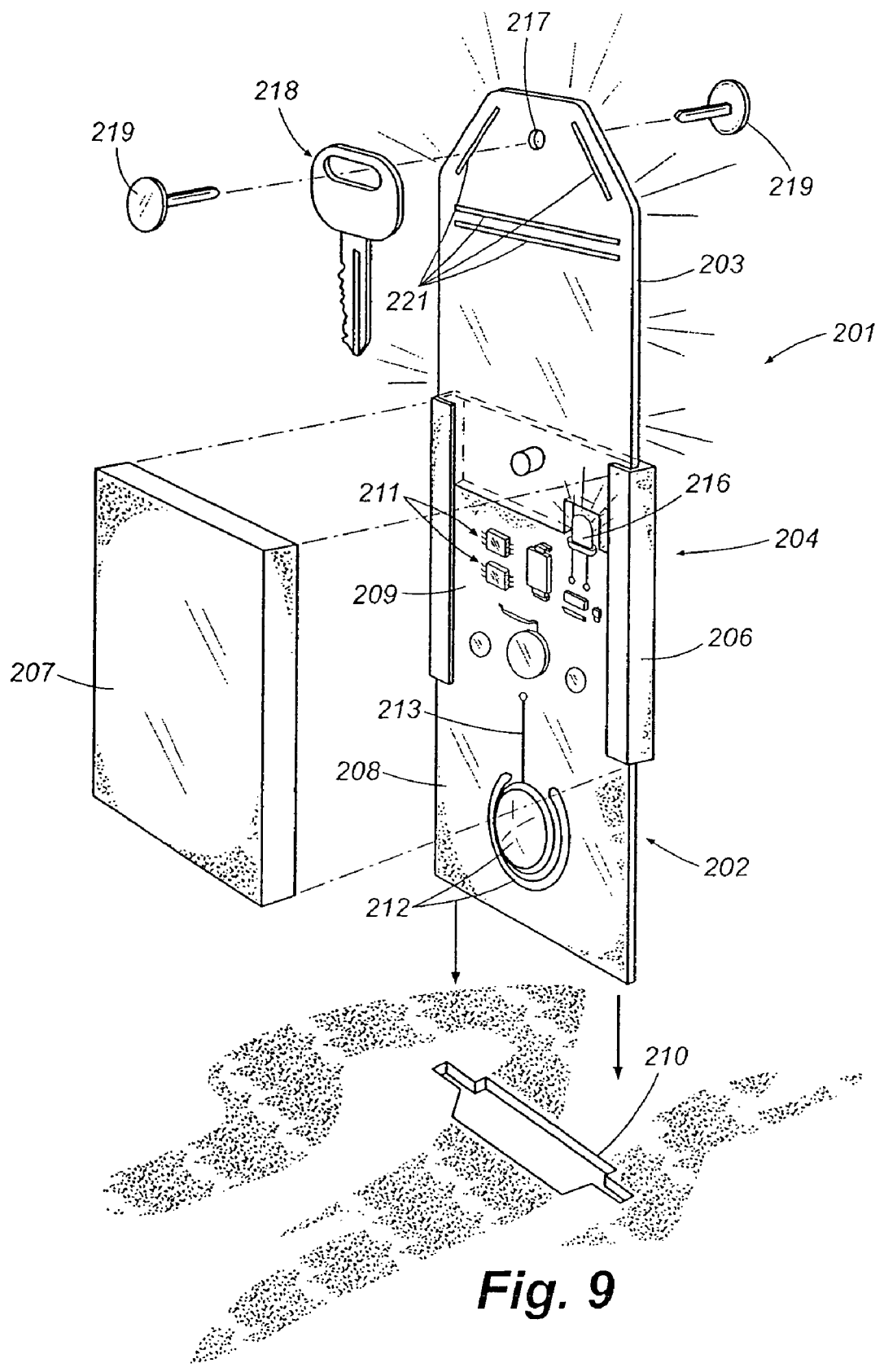
FIG. 9 is a perspective partially exploded view of a lighted key tag that embodies principles of the invention in one preferred embodiment.

FIG. 9 illustrates a lighted key tag that embodies principles of the invention in one preferred form. The key tag 201 comprises a lower portion 202, a mid portion 204 and an upper portion 203. The mid portion 204 in this embodiment includes a protective housing formed by a first housing section 206 and a second housing section 207 (shown in exploded perspective in FIG. 9) that are joined together with adhesive or appropriate fasteners to complete the protective housing. The protective housing encloses and protects the upper section 209 of a printed circuit board (PCB), the lower section 208 of which projects downwardly from the protective housing to form the lower portion 202 of the key tag. The upper section 209 of the PCB carries an electronic circuit 211, described in more detail below, which is made up of various electronic components. The electronic circuit thus is also enclosed within and protected by the housing of the mid section 204 when the two housing sections 206 and 207 are joined together.

The lower section 208 of the PCB, which defines the lower portion 202 of the key tag, carries electrically conductive pads 212 that are configured and positioned to couple with corresponding electrical contacts of a Key Track system when the lower portion 202 of the key tag is inserted in a slot 210 of the system. In the preferred embodiment, a conductive pad is formed on each side of the lower portion (the pad on one side is hidden in FIG. 9) and one pad bulges or protrudes outwardly so that the key tag is polarized to be inserted in only one orientation into a polarized slot 210 of the Key Track system. The conductive pads are electrically coupled via traces 213 to the electronic circuit 211 to couple the controller of the Key Track system to the electronic circuit. It will thus be seen that the lower portion 202 of the key tag 201 forms a downwardly depending tongue that corresponds to the downwardly depending tongue of a standard key tag such as that disclosed in the incorporated patents. Thus, the lighted key tag of the present invention is completely compatible with a Key Track system and can be intermixed with standard key tags, key boxes, and other trackable objects as desired.

The upper portion 203 of the key tag 201 is securely mounted within the mid portion 204 of the tag and has a bottom edge that generally abuts the top edge of the PCB within the mid portion. The upper portion 203 extends upwardly from the mid portion 206 to a top edge that, in this embodiment, is shaped with tapers to resemble the top edge of a standard key tag. The upper portion 302 also has vertically extending side edges that merge with the top edge thereof. A key attachment hole 217 is bored through the upper portion 203 of the key tag adjacent the top edge thereof. The hole 217 is sized to receive a rivet 219 or other appropriate fastener for securely fastening a key (or keys) 218 to the key tag in the same way that a key is attached to a standard key tag of a Key Track system. It will be understood in view of the forgoing and upon review of the incorporated patents that the key tag of FIG. 9 is somewhat similar in size and appearance to a standard plastic key tag of a Key Track system and, in fact, is configured to be used by a user of such a system just as a standard key tag would be used. However, the key tag of this invention provides distinct advantages over a standard key tag, as will become apparent from the continuing description below.

The upper portion 203 of the key tag of FIG. 9 is made of an optically transparent or at least partially transparent material such as a clear or colored plastic, Plexiglas, or other appropriate material. The upper portion 203 therefore forms a light pipe or light guide that is capable, as a result of the physics of total internal reflection, of directing light along its length with very little loss of light through its side faces. In this regard, the light guide formed by the transparent upper portion 203 functions in a manner similar to a fiber optic cable, which also can conduct light for long distances with very little loss. The electronic circuit (detailed below) includes a light source in the form of an LED 216. The LED is activated and lighted by the electronic circuit when the key tag 201 is stored in a Key Track system and is addressed by the system in response to a user request for the particular key 218 attached to the tag. The LED in the illustrated embodiment is mounted at the top of the upper section 209 of the PCB within the mid section of the tag. The LED is oriented or aimed such that, when lighted, the LED projects its light into the bottom edge of the light guide that is formed by the transparent material of the upper portion 203. In the illustrated embodiment, a small notch is formed in the bottom edge of the light guide to accommodate the LED, but scores of other configurations of the LED and bottom edge of the light guide are possible so long as the light from the LED is aimed and projected into the light guide.

It should be appreciated in view of the forgoing that when the LED 216 is lighted upon a request by a user for the key 218, the light projected from the LED into the light guide is carried or directed upwardly within and spreads throughout the upper portion 203 of the key tag. When this light reaches the vertical side edges and top edge of the light guide, it exits the light guide and is projected outwardly from the edges of the key tag as indicated by rays in FIG. 9. In fact and in practice, the light emitted from the edges of the light guide is surprisingly brilliant with the effect that the edges of the upper portion 203 of the key tag become very noticeably bright red (or another color depending upon the color of the LED) and the tag is rendered highly visible among a plurality of unlit tags. The visibility of the selected tag can be enhanced even further if the LEDs are caused to flash when the key tag is addressed. As a result, from a Key Track system user's point of view, when a key stored in the Key Track system is requested by the user through the computer interface of the system, the lighted key tag 201 to which the requested key is attached lights up to identify the requested key visually to the user so that he may remove the key for use. The somewhat cumbersome process of reading on a computer screen the row and column within a Key Track drawer of the requested key and manually locating that position within the drawer to find the key is eliminated, as is the likelihood of human error associated selecting the proper tag and key. The user simply requests a particular key and removes the lighted key tag from the drawer. In the preferred embodiment, the tag stays lighted for a few seconds after it is removed as a confirmation that the correct key tag has been drawn from the system.

As mentioned above, a light guide such as that of FIG. 9 directs light efficiently along its length with very little loss of light through its side faces. This has the potential of causing a problem if a Key Track system user happens to be viewing tags in the system from a perspective in which the edges of the tags are not visible but the side faces are. In this situation, the user might not easily discern a lighted tag from unlighted tags. To address this problem, a discontinuity 221 is formed in one or both faces of the upper portion of the key tag 201. In the illustrated embodiment, the discontinuity 221 takes the form of one or more grooves scored in the face. However, it could take other forms such as, for instance, bumps, depressions, raised areas, roughened areas, etc. formed on the face such that the term "discontinuity" as used herein includes any suitable configuration of features that may be formed on the face. In any event, the discontinuity 211, by breaking the smooth surface of the face, diverts some of the light propagating up the light guide out the side face thereof. As a result, a lighted tag is now clearly visible either from an edge perspective or from a face perspective and can be identified easily by a user regardless of his viewing angle.

Figures 10, 11:
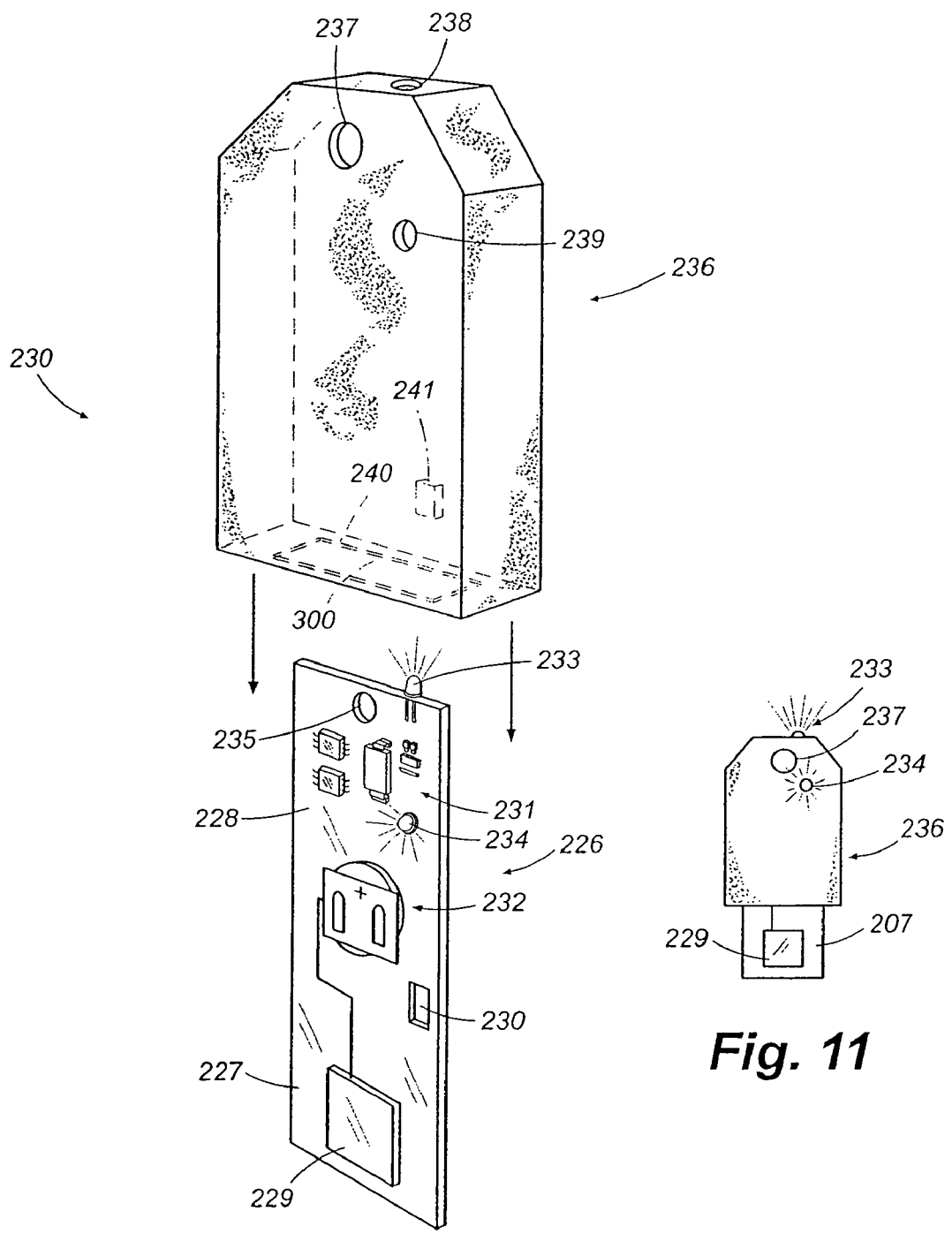
FIG. 10 is a perspective partially exploded view of a lighted key tag that embodies principles of the invention in an alternate form.
FIG. 11 is a front plan view of the lighted key tag of FIG. 10 illustrating the appearance of the tag when assembled.

FIGS. 10 and 11 illustrate yet another embodiment of a lighted key tag according to the present invention. In many respects, the key tag of this embodiment is similar to that of the previously discussed embodiment such that further detailed discussion of these aspects of the tag is not required here. The main difference between the two embodiments is that the embodiment of FIGS. 10 and 11 does not make use of a light guide to light the tag but rather simply positions LED's themselves at selected locations on the tag so that they are visible to a user. Referring in more detail to FIGS. 10 and 11, a key tag 230 comprises a printed circuit board (PCB) 226 and a housing 236 that is configured to be slipped over, receive, and house the upper portion of the PCB. When so joined (FIG. 11) the key tag resembles in many respects a standard key tag disclosed in the incorporated references in that it has a depending tongue configured to be received in a slot of a Key Track system and an upper portion, formed by the housing, that projects upwardly from the slot and to which a key or keys are securely affixed. The PCB 226 has a lower portion 227, which forms the tongue of the assembled tag, and an upper portion 228 that is disposed within the housing of the assembled tag. The lower portion 227 is provided with a raised conductive pad 229 on one side and a flush conductive pad (not visible) on the opposite side. As with the prior embodiment, these pads insure that the tag is inserted in a Key Track slot in the correct orientation and connect with connectors of the system for communicating with a system controller. The upper portion 228 of the PCB carries the components of an electronic circuit 231, which includes a battery 232, a first LED 233, and a second surface mount LED 234. The conductive pads on the tongue are connected to the circuit 231 and, as with previously discussed embodiments, the circuit is configured to activate the LEDs when the tag is in a Key Track system slot and its key is requested by a user of the system. The PCB is also formed with a key attachment hole 235 adjacent its top edge and a locking or retainer slot 230 adjacent its right edge, for purposes detailed below.

The housing 236 has an internal compartment terminating in a slot 240 with the slot and compartment being configured to receive the upper portion 228 of the PCB. The housing is sized such that when it is slid over the PCB, the electronic circuit 231 is enclosed within and protected by the housing with only the lower portion 227 and its conductive pads depending from the housing for insertion into a slot of a Key Track system (FIG. 11). The housing is formed with an internal retainer bolt 241 that is sized and positioned in the interior compartment of the housing such that when the housing is slid onto the PCB, the retainer bolt 241 snaps into the retainer slot 230 to lock the housing and PCB securely together. Many other methods of locking the two components together are also possible and all should be considered to be within the scope of the invention. A hinged flap 300 may be incorporated into the slot if desired to close against the PCB after the electronic components are completely within the housing to protect the interior of the housing from dust and tampering.

The housing 236 is further formed with a key attachment hole 237 that aligns with the hole 235 in the PCB when the two components are assembled so that a key or keys can be securely attached to the tag with a rivet or other fastener extending through the aligned holes. A light opening 238, which may or may not include a integral lens, is formed in the top edge of the housing 236 and a similar light opening 239 is formed in the side face of the housing. The light openings 238 and 239 are positioned to align with the LEDs 233 and 234 respectively when the housing and PCB are joined so that light emitted from the LED's can be seen through the holes. Thus, the LED's, when lit, project their light upwardly from the top edge of the key tag and sidewise from the side face of the tag. As with the prior embodiment, when a user requests a key associated with a key tag stored in a Key Track system, the circuit 231 of that key tag lights the LEDs 233 and 234, which, in turn, identify the requested key to the user regardless of the viewing perspective of the user.

Figure 12:
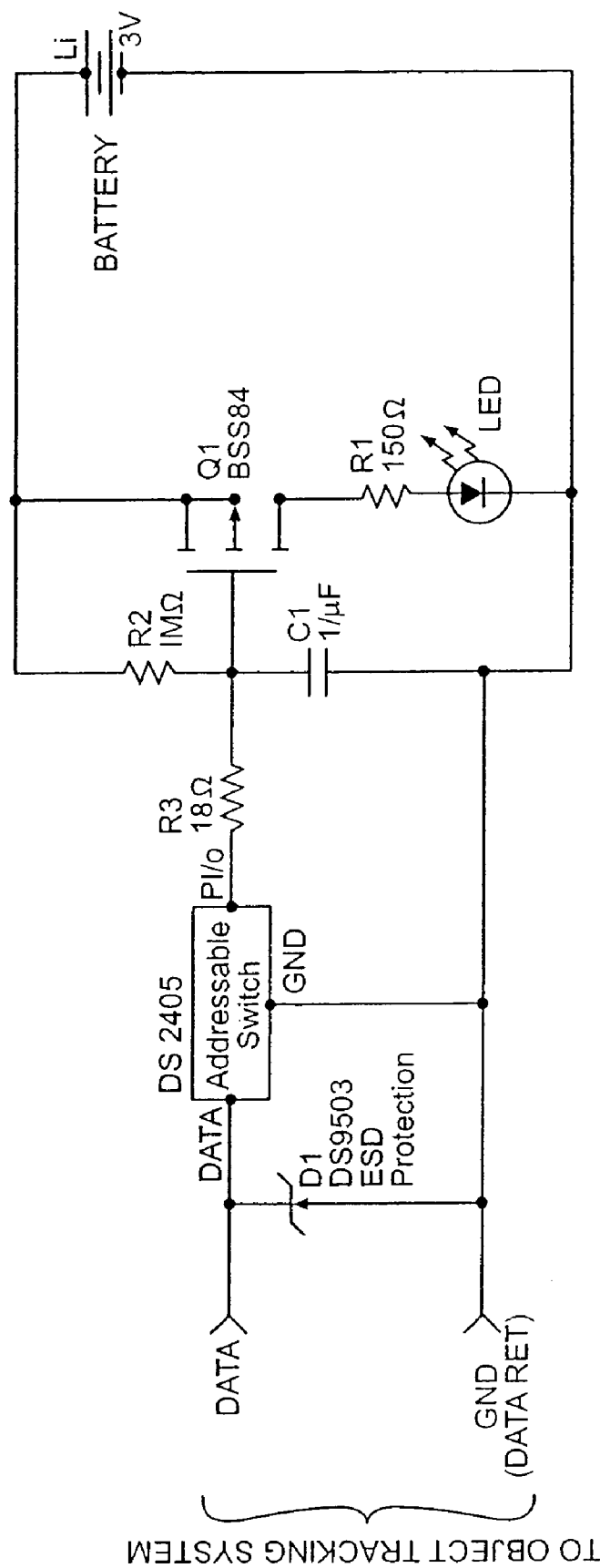
FIG. 12 is an electronic schematic diagram showing an alternate embodiment of a circuit suitable for use in the lighted key tags and lighted containers of the present invention.

FIG. 12 is an electronic schematic illustrating a preferred embodiment of the electronic circuits 211 and 231 of the key tags in FIGS. 10 and 11 respectively. The circuit is virtually the same as the circuit of FIG. 7 with the battery alternative implemented rather than drawing power from the Key Track system through a third conductive pad on the tongue of the key tag. In this way, the lighted tags of this invention function with existing two wire Key Track systems such as those disclosed in the incorporated patents. Referring in more detail to FIG. 12, the circuit, as is the circuit in FIG. 7, is based around an addressable switch chip that stores a unique identification code and that can be addressed by that code to cause the chip to set its I/O port or ports high or low or to toggle them depending upon the particular chip chosen. In the preferred embodiment of FIG. 12, the addressable switch chip is a DS2405 addressable switch available from Dallas Semiconductor that sets its I/O port low (i.e. connects it to the ground pin) when the chip is addressed. However, this particular chip is not a limitation of the invention and other addressable switches may be substituted. Indeed, any chip, whether or not it is formally known as an "addressable switch," that can be configured to respond in a manner usable to light an LED when addressed by a controller is contemplated to be within the scope of this invention and is included within the meaning of the term "addressable switch" as used herein.

The addressable switch in the circuit of FIG. 12 has a data pin, a ground pin, and a input/output or PI/O pin. The data pin is electrically connected to the conductive pad of a key tag used for addressing the switch and the ground pin is connected to the ground or data return conductive pad. The pads, in turn, connect the addressable switch to the computer controller through electrical contacts when a key tag is inserted into a slot of a Key Track system. A zener diode D1 may be connected between the data and ground pins of the addressable switch if desired to protect the switch against voltage spikes and electrostatic discharges. The I/O pin of the addressable switch is connected to the base of transistor Q1, which is configured as a switch. The transistor Q1 may be a BSS84 P-Channel Enhancement Mode Vertical DMOS FET or any other suitable transistor capable of switching sufficient current to operate an LED. A current limiting resistor R3 is connected in series with the I/O addressable switch to limit current through the addressable switch chip and to provide a short protective time buffer. The transistor Q1 is configured to switch on when the I/O pin of the addressable switch is set low and pulls the base of the transistor low as a result of the addressable switch being addressed with its unique identification code. One or more LED's, depending upon the key tag embodiment, is connected in series with the transistor Q1 through a current limiting resistor R1. Power for lighting the LED is provided by a battery, which, in the preferred embodiment, is a 3V Lithium Ion battery for long reliable life. It will thus be seen that when the addressable switch in a key tag is addressed by a Key Track controller with the identification code of the switch, the I/O pin of the switch is pulled low, which causes transistor Q1 to switch on thereby lighting the LED.

It has been noted during development of lighted key tags that the LED shuts off when the key tag is removed from its slot because the I/O port of the addressable switch resets to a floating state and is pulled high immediately by the battery. However, it is desirable for the key tag to stay lighted for a short period after it is removed from its slot as a confirmation to the user that the correct tag has indeed been removed from the Key Track system. In order to address this need, the circuit of FIG. 12 includes a delay function provided by capacitor C1 and resistor R2. Briefly, this delay circuit functions as follows. The transistor Q1 is on (conducting) when its base is low. Accordingly, when the addressable switch is addressed and sets its I/O pin low in response, the base of the transistor is pulled low through resistor R3 and the transistor turns on to light the LED. When the key tag is removed from its slot, the disconnection immediately causes the I/O pin of the addressable switch to float (i.e. it is no longer connected to the ground pin). This normally would cause the transistor to turn off immediately since its base would be pulled high instantly by the positive terminal of the battery. However, with the delay function in place, the capacitor C1 begins to charge slowly through resistor R2 according to a time constant determined by the values of resistance and capacitance (about 2–3 seconds for example). When the capacitor charges to a voltage above the turn-on threshold of the transistor, the transistor turns off and the LED is extinguished. Accordingly, when the key tag is removed from its slot, the tag remains lighted for a short period of time (2–3 seconds) to confirm to the user that he has pulled the correct tag. The delay circuit also addresses the tendency of the LEDs to flash or blink intermittently when the key tags are in their slots due to unexpected data matrix events such as shorts.

The invention has been described herein in terms of preferred embodiments and methodologies. It will be clear to those of skill in the art, however, that various additions, deletions, and modifications might well be made to the illustrated embodiments within the scope of the invention. For example, the tag lighting technique of FIG. 9 wherein a portion of the tag forms a clear light guide also is applicable to key boxes such as the key box illustrated in FIG. 6. In such a key box, one side of the box or the entire box might be fabricated of a transparent plastic or other material that forms a light guide for directing light upwardly to the exposed top of the box. While not specifically discussed above, it has also been found advantageous to include a simple flashing circuit to cause the LEDs of key tags to flash rather than just turning on when the tags are addressed. Also, while plastics are considered ideal materials for forming many of the components of the lighted tags and PCB material ideal for carrying electronic components, these materials are not limiting to the invention and any suitable material may be selected for any of the components of the tags, all within the scope of the invention. These and numerous other additions, deletions, and modifications might well be made to the preferred embodiments disclosed herein without department from the spirit and scope of the invention as set forth in the claims.

What is claimed is:

1. In a key tracking system wherein one or more keys are each may be attached to a trackable object and are removably storable in a storage unit, the keys being individually requestable by a user via a computer controller coupled to said storage unit, the improvement comprising an LED associated with each trackable object and an electronic circuit associated with each trackable object and coupled to said LED, each of said electronic circuits being adapted to light its LED when a key attached to the trackable object is requested by the user to identify to the user the location of the requested key within the storage unit.

2. The improvement of claim 1 and wherein said storage unit has a plurality of slots for receiving trackable objects stored in said storage unit and wherein each of said trackable objects comprises a key tag having a first portion configured to be received in a selected slot when said key tag is stored in said storage unit.

3. The improvement of claim 2 and wherein each key has a second portion that projects upwardly from a slot in which said key tag is received and to which keys associated with said key tag are affixed and wherein said LED, when activated, projects light at least upwardly from said second portion of said key tag.

4. The improvement of claim 3 and wherein said key tag includes an upwardly extending light guide having a bottom end and a top end terminating adjacent an upper edge of said second portion, said LED positioned to project light into said bottom end of said light guide.

5. The improvement of claim 4 and wherein said key tag is made of an at least partially transparent material that forms said light guide, the light from said LED propagating upwardly through said transparent material and projecting from said key tag when said LED is activated.

6. The improvement of claim 5 and further comprising a discontinuity formed in said transparent material, said discontinuity diverting a portion of the light from said LED sideways toward an edge of said key tag.

7. The improvement of claim 1 and wherein said first portion carries a memory device thereon.

8. The improvement of claim 7 and further comprising a second LED disposed on a side of said key tag and coupled to said electronic circuit for projecting light sidewardly from said tag when the second LED is activated such that the lighted second LED is visible to a user from the side of said key tag.

9. A key tag for use in a key tracking system having a storage receptacle provided with an array of slots for receiving key tags and a controller for determining the absence or presence of key tags disposed in the slots, said key tag comprising:
 a. a first portion being configured for coupling with the key tracking system;
 b. a second portion housing an electronic memory storing device having an identification code uniquely identifying said key tag and a key attached thereto, said electronic memory storing device being addressable by said key tracking system; and
 c. a third portion to which a key associated with said key tag may be affixed;
 d. wherein an LED coupled to an electronic circuit coupled to said memory storing device, said electronic circuit lighting said LED when addressed by said key tracking system;
 e. said LED, when lighted, projecting light to identify said key tag visually to a user of said key tracking system.

10. A key tag as claimed in claim 9 and wherein said first and second portion are the same, and wherein said memory storage device is electronically coupled with said key tracking system.

11. A key tag as claimed in claim 9 and further comprising a second LED coupled to said electronic circuit, said second LED being positioned to direct light on a side of said key tag.

12. A key tag as claimed in claim 9 and wherein said electronic circuit maintains said LED lighted for a predetermined period of time after being addressed by said key tracking system.

13. A key tag as claimed in claim 9 and wherein said key tag is defined by a top edge and side edges and at least a portion of said key tag forms a light guide, said LED, when lit, projecting light upwardly through said light guide to be emitted from edges of said key tag.

14. A key tag as claimed in claim 13 and wherein said LED is located and oriented so as to project light into said light guide formed by said key tag.

15. A key tag as claimed in claim 13 and further comprising at least one feature formed on said light guide for diverting some of said light sideways to a side edge of said key tag.

16. A key tag as claimed in claim 15 and wherein said feature includes grooves.

17. In a key tracking system wherein one or more keys may be attached to a trackable object and are removably storable in a plurality of slots in a storage unit, the keys being individually requestable by a user via a computer controller coupled to said storage unit, the improvement comprising:
 a. a plurality of trackable objects, each trackable object comprising a key tag;
 b. an LED associated with each trackable object and an electronic circuit associated with each trackable object and coupled to said LED, each of said electronic circuits being adapted to light its LED when a key attached to the trackable object is requested by the user to identify to the user the location of the requested key within the storage unit;
 b. wherein each of said key tags comprises:
 c. a first portion configured to be received in a selected slot when said key tag is stored in said storage unit, said first portion having a shoulder from which a downwardly depending tongue extends, wherein said shoulder is configured to abut the storage unit and said tongue is configured to extend into a slot when said key tag is stored in said storage unit;
 d. a second portion that projects upwardly from a slot in which said key tag is received and to which keys associated with said key tag may be affixed, and wherein said LED, when activated, projects light at least upwardly from said second portion of said key tag; and
 e. an upwardly extending light guide having a bottom end and a top end terminating adjacent a top edge of said second portion, said LED positioned to project light into said bottom end of said light guide.

18. The improvement of claim 17 and wherein said key tag is made of an at least partially transparent material that forms said light guide, the light from said LED propagating upwardly through said transparent material and projecting from said key tag when said LED is activated.

19. The improvement of claim 17 and wherein said first portion carries a memory device thereon.

* * * * *